United States Patent
Zander et al.

(10) Patent No.: US 12,192,788 B2
(45) Date of Patent: Jan. 7, 2025

(54) WIRELESS COMMUNICATION WITH SPATIAL LIMITATION

(71) Applicant: Sony Group Corporation, Tokyo (JP)

(72) Inventors: Olof Zander, Södra Sandby (SE); Fredrik Rusek, Eslöv (SE); Kåre Agardh, Rydebäck (SE); Erik Bengtsson, Eslöv (SE)

(73) Assignee: Sony Group Corporation, Tokyo (JP)

( * ) Notice: Subject to any disclaimer, the term of this patent is extended or adjusted under 35 U.S.C. 154(b) by 313 days.

(21) Appl. No.: 17/762,073

(22) PCT Filed: Sep. 2, 2020

(86) PCT No.: PCT/EP2020/074487
§ 371 (c)(1),
(2) Date: Mar. 20, 2022

(87) PCT Pub. No.: WO2021/063622
PCT Pub. Date: Apr. 8, 2021

(65) Prior Publication Data
US 2022/0377575 A1    Nov. 24, 2022

(30) Foreign Application Priority Data
Oct. 4, 2019    (SE) .................................... 1951136-9

(51) Int. Cl.
*H04W 16/28*    (2009.01)
*H04W 72/23*    (2023.01)

(52) U.S. Cl.
CPC ........... *H04W 16/28* (2013.01); *H04W 72/23* (2023.01)

(58) Field of Classification Search
CPC ..... H04W 16/28; H04W 72/23; H04W 72/51; H04W 72/046
USPC .................................................. 370/329, 330
See application file for complete search history.

(56) References Cited

U.S. PATENT DOCUMENTS

| | | | | |
|---|---|---|---|---|
| 11,923,939 B2* | 3/2024 | Chen | .................... | H04B 7/0639 |
| 2014/0295858 A1* | 10/2014 | Li | .......................... | H04W 48/06 |
| | | | | 455/450 |
| 2018/0368104 A1 | 12/2018 | Xia et al. | | |
| 2019/0319686 A1* | 10/2019 | Chen, IV | ............. | H04B 7/0639 |
| 2020/0037345 A1* | 1/2020 | Ryoo | ................ | H04W 74/0833 |
| 2020/0146099 A1* | 5/2020 | Abedini | ................ | H04L 1/0003 |

(Continued)

FOREIGN PATENT DOCUMENTS

WO    2017196612 A1    11/2017

OTHER PUBLICATIONS

International Search Report and Written Opinion from corresponding International Application No. PCT/EP2020/074487, mailed on Nov. 2, 2020, 13 pages.

(Continued)

*Primary Examiner* — Chuong T Ho
(74) *Attorney, Agent, or Firm* — Tucker Ellis LLP

(57) ABSTRACT

A method for controlling radio transmission, carried out in a wireless terminal (10), comprising obtaining (435), from a wireless network (100,120), a transmission grant (430) which gives the wireless terminal permission to transmit a radio signal, wherein said transmission grant is indicative of a spatial limitation associated with the permission to transmit; and transmitting (440) the radio signal in accordance with said spatial limitation.

17 Claims, 4 Drawing Sheets

(56) References Cited

U.S. PATENT DOCUMENTS

2023/0284269 A1\* 9/2023 Sehgal .............. H04W 74/0808
370/338

OTHER PUBLICATIONS

Ericsson, "On beam indication, measurement, and reporting," 3GPP TSG-RAN WG1 NR Ad Hoc #3, R1-1716350, Sep. 18-21, 2017, 13 pages.

\* cited by examiner

WIRELESS COMMUNICATION WITH SPATIAL LIMITATION

TECHNICAL FIELD

This disclosure relates to the concept of controlling radio transmission carried out in a wireless terminal. Specifically, solutions are provided for providing requests and grants of resources for radio transmission, where such grants are associated with spatial properties.

BACKGROUND

For achieving higher data bandwidth, the spectrum used for communication on radio channels is expected to move to higher frequencies, e.g., to frequencies beyond 6 or 10 GHz. This is for example provided for under the specifications of so called 5G systems within the 3$^{rd}$ Generation Partnership Project (3GPP), and specifically New Radio (NR). Initially, it may be noted that in such a system a wireless terminal is generally referred to as a User Equipment (UE), whereas a base station of such a cellular system is referred to as a gNB.

Both the base stations and wireless terminals configured to operate in a wireless communication system at these frequencies may be equipped with antenna arrays, making spatial filtering or beam forming in different directions possible. This is due to the well-defined spatial transmission characteristics of electromagnetic waves in this frequency spectrum. At such high frequencies, numerous new types of services are expected to evolve.

Many NR features currently discussed in 3GPP involve the need of a wireless terminal to request resources from the base station, and for at least some of those services the subsequent transmission or communication carried out by the wireless terminal does necessarily involve the base station as such. This may relate to device to device (D2D) communication, radar probing etc. At the same time, the number of wireless terminals in operation is expected to continue to grow. The increasing number of services and wireless terminals will increase the amount of signaling in the system.

There is consequently a need for solutions for managing control of radio transmission from wireless terminals, and for managing system signaling overhead.

SUMMARY

Various solutions targeting these objectives are provided herein. Specifically, methods and devices as set out in the independent claims are provided. These solutions involve, inter alia, that a wireless terminal will obtain a transmission grant from a wireless network, which grant gives the wireless terminal permission to transmit a radio signal, wherein said transmission grant is indicative of a spatial limitation associated with the permission to transmit.

By means of such solutions, a wireless terminal capable of selectively transmitting radio signals with a certain spatial characteristic may be controlled to operate dependent on the spatial limitation. The wireless network may thereby control wireless terminals to transmit so as to optimize use of the air interface, by allowing traffic under certain restrictions in circumstances that no traffic would normally be allowed due to e.g. resulting interference.

Various embodiments are set out in the dependent claims.

DETAILED DESCRIPTION

Figure 1:
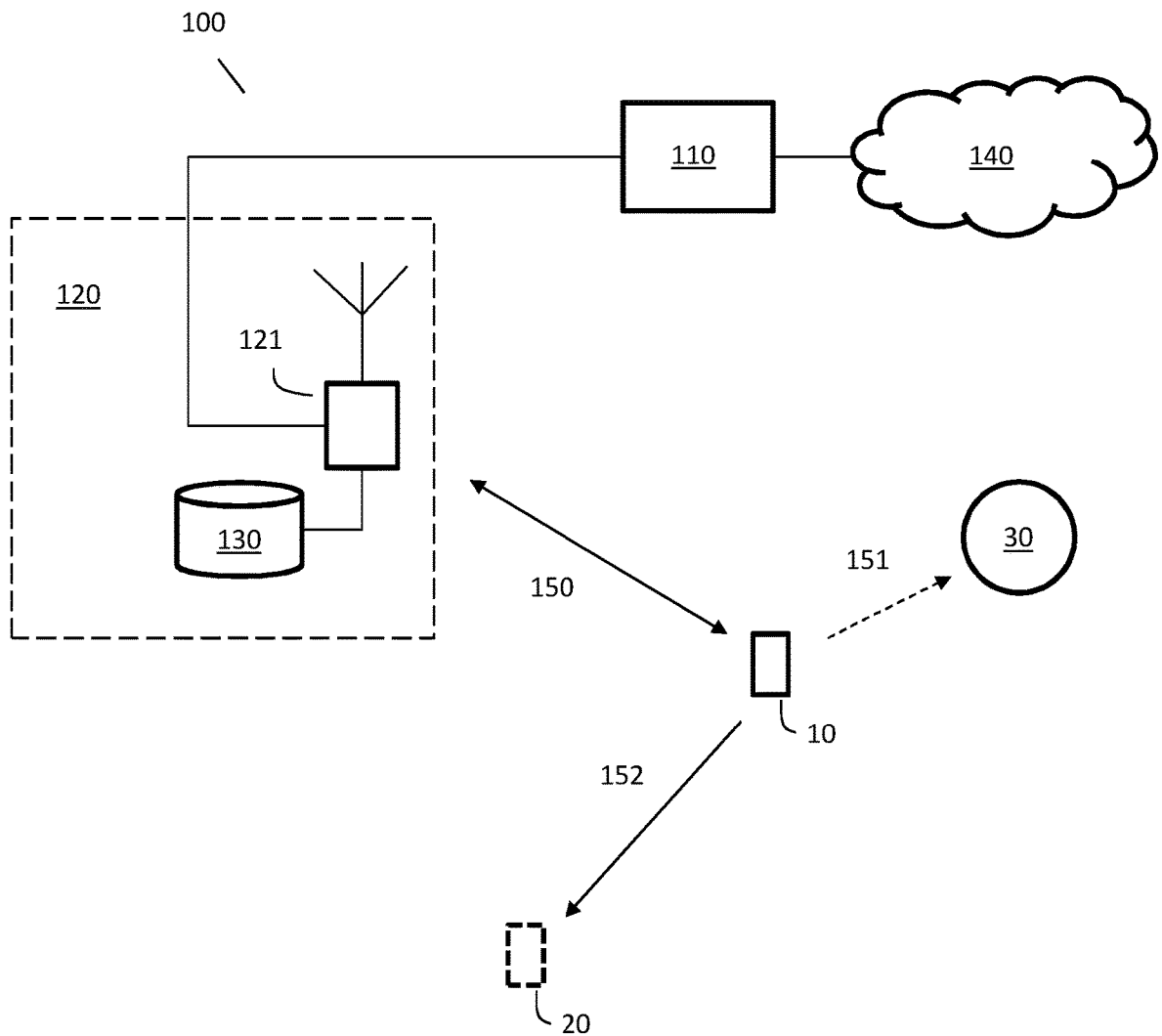
FIG. 1 schematically illustrates a system for wireless communication including a wireless network and a at least one wireless terminal according to various embodiments.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques for are described for managing radio transmission from a wireless terminal under spatial limitations. These techniques may be set out in a wireless terminal configured to selectively transmit radio signals with different spatial characteristics, or in a wireless network configured to control such a wireless terminal, and further involves methods employing signaling between the wireless terminal and the wireless network. The ability of a wireless terminal to transmit with different spatial characteristics may be realized by means of an antenna array of the wireless terminal. In various embodiments, radio transmission is carried out in a mm wave frequency band, e.g. above 6 GHz.

FIG. 1 schematically illustrates a scenario in a wireless communication system in which the presented solutions may be set out. A wireless network 100 may comprise a core network 110, which may be connected to other networks, e.g. through the Internet 140. The wireless network 100 further comprises one or more base stations, of which one base station 120 is illustrated. The base station 120 is configured for wireless communication 120 with various wireless terminals. The base station may comprise a transmission point (TRP) 121, comprising an antenna system, and control logic 130 configured to communicate with the core network 110. The control logic 130 may be arranged in conjunction with the TRP 121 and logic for controlling the antenna system of the TRP. Alternatively, the control logic 130 may be remotely arranged with respect to the TRP 121. Functionally, the TRP 121 and the control logic are nevertheless collectively referred to herein as the base station 120.

A first wireless terminal 10 is shown, also referred to as terminal for short herein, operative to communicate 150 wirelessly with the wireless network 100. The terminal 10 may be selected from the group comprising at least handheld device; mobile device; robotic device; smartphone; laptop; drone; tablet computer; wearable devices, IoT (Internet of Things) devices, smart meters, communication modems/access points, navigation devices (GPS units), cameras, CAM recorder etc.

In at least legacy behavior of wireless communications, the terminal 10 may be allocated a resource by the wireless network 100, such as by the base 120, which resource is subsequently used by the terminal 10 for transmitting and/or receiving data or a signal. In various wireless communication systems, such as NR, a resource is typically thought of as a portion of time-frequency space.

There are several tasks situations where a UE would need to request resources from the gNB, or be provided with resources on the network's initiative, in order to carry out a certain task that involves radio transmission towards another recipient than the base station 120. Such a task may for example relate to radar probing. During such radar probing, the terminal 10 may be configured to execute radio transmission 151 towards an object 30, from which object 30 echoes are subsequently detected, in the terminal 10 or in another receiving device, for the purpose of determining e.g. position, speed, shape or other characteristics of the object 30. Another example of such a task may be transmission 152 for D2D communication with or signaling to a recipient device 20, such as another wireless terminal.

In this disclosure, various embodiments are presented in which a request for resources forms a request for a certain spatial direction, in which the wireless terminal 10 obtains a transmission grant from the wireless network 100 to transmit at will in time-frequency space, or within a certain frame of time and a certain frequency band.

Figure 2:
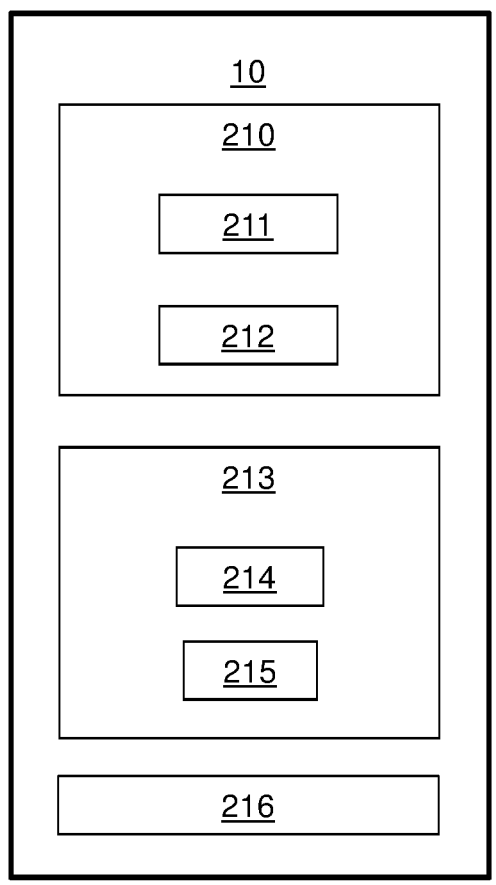
FIG. 2 schematically illustrates a wireless terminal configured to act in accordance with various embodiments.

FIG. 2 schematically illustrates a wireless terminal 10 for use in a wireless network 100 as presented herein, and for carrying out the method steps as outlined. The terminal 10 may comprise a wireless transceiver 213, such as a chipset, for communicating with other entities of the radio communication network 100, such as the base station 120.

The wireless transceiver 213 may thus include a radio transmitter 214 and a radio receiver 215 for communicating through at least an air interface on a radio channel 150.

The terminal 10 further comprises logic 210 configured to communicate data via the radio transceiver on the radio channel 120, to the wireless communication network 100 and possibly directly with other terminals 20 by Device-to-Device (D2D) communication, such as in sidelink communication. In various embodiments, the logic 210 forms part of the transceiver 213.

The logic 210 may include a processing device 211, including one or multiple processors, microprocessors, data processors, co-processors, and/or some other type of component that interprets and/or executes instructions and/or data. Processing device 211 may be implemented as hardware (e.g., a microprocessor, etc.) or a combination of hardware and software (e.g., a system-on-chip (SoC), an application-specific integrated circuit (ASIC), etc.). The processing device 211 may be configured to perform one or multiple operations based on an operating system and/or various applications or programs.

The logic 210 may further include memory storage 212, which may include one or multiple memories and/or one or multiple other types of storage mediums. For example, memory storage 212 may include a random access memory (RAM), a dynamic random access memory (DRAM), a cache, a read only memory (ROM), a programmable read only memory (PROM), flash memory, and/or some other type of memory. Memory storage 212 may include a hard disk (e.g., a magnetic disk, an optical disk, a magneto-optic disk, a solid state disk, etc.).

The memory storage 212 is configured for holding computer program code, which may be executed by the processing device 211, wherein the logic 210 is configured to control the terminal 10 to carry out any of the method steps as provided herein. Software defined by said computer program code may include an application or a program that provides a function and/or a process. The software may include device firmware, an operating system (OS), or a variety of applications that may execute in the logic 210.

The terminal 10 may further comprise an antenna 216, such as an antenna array 216. The logic 210 may further be configured to control the radio transceiver to employ an anisotropic sensitivity profile of the antenna array 216 to transmit radio signals in a particular transmit direction. The terminal 10 may further comprise other elements or features than those shown in the drawing or described herein, such as a positioning unit, a power supply, a casing, a user interface etc.

Figure 3:
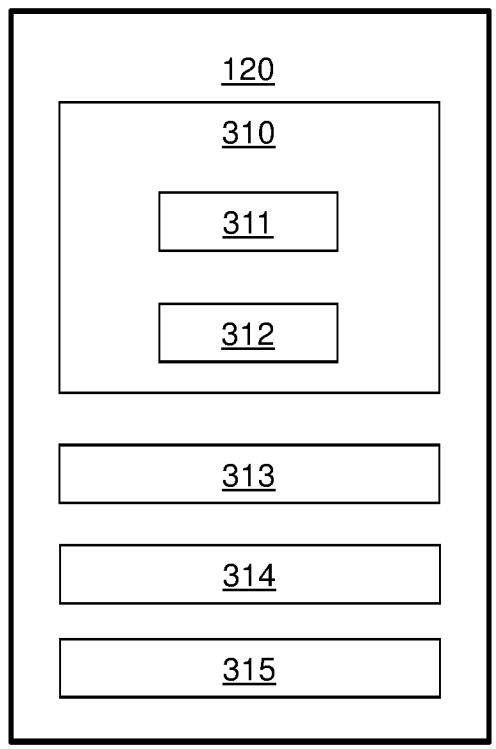
FIG. 3 schematically illustrates a base station of a wireless network, configured manage radio transmission from a wireless terminal according to various embodiments.

FIG. 3 schematically illustrates a base station 120, also called access node, of the wireless 100, adapted to wirelessly communicate with wireless terminals such as the terminal 10, and configured for carrying out the associated method steps as outlined. This embodiment is consistent with the scenario of FIG. 1.

The base station 120 may comprise a wireless transceiver 313 for communicating with other entities of the wireless network 100, such as the terminal 10, through at least an air interface on a radio channel 150. The base station 120 may further comprise an interface 314 for communicating with the core network 110.

The base station 120 further comprises logic 310 configured to control at least the wireless transceiver 313 to communicate data on the radio channel 150 to terminals including terminal 10.

The logic 310 may include a processing device 311, including one or multiple processors, microprocessors, data processors, co-processors, and/or some other type of component that interprets and/or executes instructions and/or data. Processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic 310 is configured to control the base station 120 to carry out any of the method steps as provided herein. Software defined by said computer program code may include an application or a program that provides a function and/or a process. The software may include device firmware, an operating system (OS), or a variety of applications that may execute in the logic 310.

The base station 120 may further comprise or be connected to an antenna 315, such as an antenna array 315. The logic 310 may further be configured to control the wireless transceiver 313 to employ an anisotropic sensitivity profile of the antenna array 315 to transmit radio signals in a particular transmit direction.

In various embodiments, the wireless terminal 10 and the base station 120 are configured to operate at a mm wave Frequency Range (FR), such as FR2 as provided for in NR.

Figure 4:
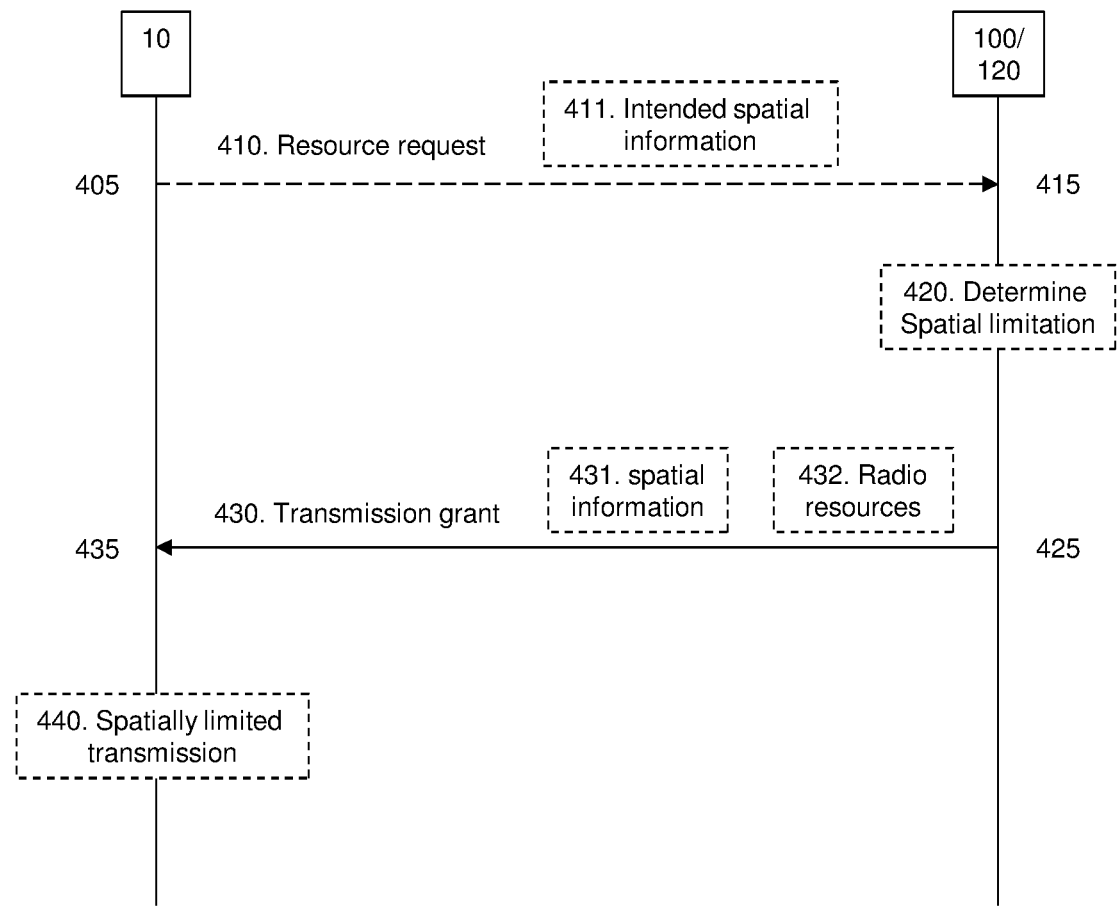
FIG. 4 schematically illustrates a signaling diagram for various embodiments of controlling radio transmission from a wireless terminal.

FIG. 4 schematically illustrates a signaling diagram representing various embodiments as outlined herein. The diagram shows the terminal 10 to the left and the base station 120 to the right. Signaling paths are indicated, as well as data or indicative information being conveyed by signaling between the two parties 10, 120.

In a first general aspect, a method is provided for controlling radio transmission, carried out in the wireless terminal 10. In other words, the terminal 10 is configured to carry out these method steps for controlling its radio transmission.

The method comprises obtaining 435, from the wireless network 100, such as through the base station 120, a transmission grant 430 which gives the wireless terminal 10 permission to transmit a radio signal. Moreover, the transmission grant 430 is indicative of a spatial limitation associated with the permission to transmit. Subsequently, the terminal 10 transmits 440 the radio signal in accordance with said spatial limitation.

This first general aspect thus also relates to a wireless terminal 10 configured to communicate with a wireless network 100, comprising a radio transceiver 213; and logic 210 configured to control the radio transceiver to obtain 435 a transmission grant 430 from the wireless network, wherein said transmission grant is indicative of a spatial limitation associated with a permission to transmit a radio signal; and transmit 440 the radio signal in accordance with said spatial limitation.

In a second general aspect, a method is also provided for configuring a wireless terminal 10 for radio transmission, carried out in the wireless network 100. This method comprises transmitting 425, to the wireless terminal 10, a transmission grant 430, wherein said transmission grant is indicative of a spatial limitation associated with a permission for the wireless terminal to transmit a radio signal.

This second general aspect thus also relates to a base station 120 of a wireless network 100, comprising logic 310 configured to control an associated transmission point 121 to transmit 425, to a wireless terminal 10, a transmission grant 430 indicative of a spatial limitation associated with a permission for the wireless terminal to transmit a radio signal.

These methods and devices provide the technical effect of the wireless network 100 providing the terminal 10 a grant to transmit, e.g. corresponding to an uplink grant, but with an associated spatial limitation. The transmission grant may e.g. be provided in RRC signaling. This way, the terminal 10 may be controlled or allowed to transmit in a manner that the wireless network 100 may ascertain is not interfering or being disruptive with respect to other wireless communication controlled by the base station 120, such as within its cell region.

In the various solutions provided herein, spatial limitation identifies a spatial constrain in the permission to transmit, as opposed to free permission to transmit without spatial consideration. The spatial limitation defines that the permission for the wireless terminal to transmit a radio signal has an attached spatial definition related to direction and/or range of transmission.

In some embodiments, the spatial limitation defines one or more directions in which transmission is allowed from a certain position, as opposed to free permission to transmit from that position. This may be identified by means of the wireless terminal identifying an intended direction of transmission, and a position of transmission, and subsequently obtaining permission based on the identified intended direction. Alternatively, the transmission grant may indicate the directions in which transmission grant is permitted, related to a position of transmission, which position may be obtained from the wireless terminal or determined by the wireless network.

In some embodiments, the spatial limitation defines one or more directions in which transmission is not allowed, such as an angle, space angle, sector or the like. This may be associated with a position of transmission, i.e. of the wireless terminal. Alternatively, the one or more directions in which transmission is not allowed may be identified by definition of a position or area towards which transmission from the wireless terminal is disallowed. That position or area may e.g. be a location of a TRP, such as the TRP from which the transmission grant is obtained, or a direction in which side link communication is used by other wireless terminals. The terminal may, subsequently determine the one or more directions in which transmission is not allowed, based on its own position and information of the position or area towards which transmission from the wireless terminal is disallowed, which may be indicated explicitly or implicitly in the transmission grant.

In various embodiments, the spatial limitation may be defined by one or more spatial properties such as position data, transmission direction data such as an angle of transmission in 2 or 3 dimensions, absolute polarization data, an opening angle, i.e. width, of a transmission cone associated with the transmission direction data in 2 or 3 dimensions, distance of intended transmission, etc. The transmission grant may thus in various embodiments indicate the spatial limitation by including, or referring to, geographic position data and/or vector data, and may possibly indicate or refer to tolerance data identifying an angle or cone angle width, which defines a sector or cone within which the permission to transmit is restricted, or alternatively disallowed. Examples related to these parameters will be provided below. Responsive to obtaining such a transmission grant with an associated spatial limitation, the wireless terminal shall be obliged and controlled to transmit radio signals in accordance with the identified spatial limitation. This may be obtained by means of the logic 210 being configured to control the radio transceiver to employ an anisotropic sensitivity profile of the antenna array 216 to transmit radio signals only in allowed directions, such as by beamforming.

The transmission grant 430 may as such be obtained in a handshake procedure between the terminal 10 and the base station 120, and information obtained 435 in that transmission grant 430 may be received in the wireless terminal 10 in one or more different messages from the base station 120.

In some embodiments, obtaining the transmission grant includes receiving 435, from the wireless network, information 432 indicative of radio resources to be used for the transmitting, wherein said radio signal is transmitted 440 using the radio resources. In such an embodiment, the transmission grant 430 thus includes an indication of which radio resources the terminal 10 may or shall use, and the spatial limitation associated with transmission using those radio resources. This provides for a convenient way of conveying information on the spatial limitation, where a limitation is dependent on the resources used.

In other embodiments, the transmission grant 430 is a grant to transmit under the associated spatial limitation, without further specifying radio resources. Rather, the transmission grant 430 provides, to the terminal 10, an "at will" grant to transmit 440, provided the spatial limitation is respected by the terminal 10. In some embodiments, such a grant 430 may be associated with a time frame within which the terminal 10 may transmit at will within the associated spatial limitation, or alternatively a further message may be signaled from the wireless network 100 to the terminal 10, terminating the transmission grant. Such embodiments have the benefit of providing the terminal 10 with a higher degree of freedom to use the radio interface, as long as the obtained spatial limitation is respected.

In some embodiments, the transmission grant 430 is obtained responsive to the wireless terminal 10 transmitting 405, to the wireless network 100, information 411 defining spatial properties of an intended radio signal transmission from the wireless terminal. The information 411 defining spatial properties may be transmitted in a resource request message 410, transmitted from the terminal 10 for receipt 415 in the wireless network 100. In other embodiments, the information 411 defining spatial properties may be transmitted after resources, e.g. time/frequency/code resources, have already been obtained in the terminal 10. In such embodiments, the terminal 10, wanting to make use of a certain type of service or application, such as D2D communication or radar probing, may thus conveniently request a grant from the wireless network 100 while informing the wireless network of spatial properties of at least its intended transmission during use of that service or application.

The wireless network 100, receiving 415 the information 411 defining spatial properties of an intended radio signal transmission, may subsequently determine 420 the spatial limitation based on the request. The wireless network 100 may in this instance base the determination of the spatial limitation on parameters such as position of other known terminals or base stations, and overall radio traffic.

In some embodiments, wherein the terminal 10 informs 411 the network 100 of intended spatial information, and the network 100 grants the terminal 10 the right to execute that transmission based on said spatial properties, the spatial limitation may be conveyed to the terminal 10 as a downlink ACK of the spatial information 411, i.e. without further defining any spatial information to the terminal 10. Alternatively, the spatial limitation determined 420 by the network 100 may prescribe different spatial properties than the spatial properties of the intended radio signal transmission sent by the terminal 10 in the uplink. For example, the spatial limitation may be conveyed as a spatial information 431, signaled in the downlink, where said spatial information 431 may be a subset or modification of the intended spatial information 411.

In some embodiments, obtaining the transmission grant thus includes receiving 435, from the wireless network 100, spatial properties 431 of the permission to transmit a radio signal. The network 100 thus provides an identification of determined 420 spatial limitation. Transmission 425 of the spatial properties 431 of the permission to transmit a radio signal may be triggered by a network 100 entity, e.g. an application server connected to the network 100, or be based on a terminal 10 resource request 410.

In some embodiments, the spatial properties 411, 431 may define a wireless terminal position, such as a geographic position, or a relative position with respect to another object or position, such as the base station 120. Moreover, the spatial properties 411, 431 may identify a current position, or a projected position at a certain point in time, or a position and a speed and direction of movement, etc.

In some embodiments, the spatial properties 411, 431 may define a direction associated with intended transmission from the terminal 10. The direction may identify a fix angle or angle range, or cone angle, of either direction from intended transmission position or relative to an angle to base station 120. Alternatively, the spatial properties may define a direction associated with intended transmission by identification of a position of an intended receiving unit 20, 30.

In some embodiments, the spatial properties 411, 431 define a transmission power limit. This forms a spatial limitation by providing a distance limitation of transmission from the terminal 10.

In some embodiments, obtaining the transmission grant includes the terminal 10 transmitting 405, to the wireless network 100, an indication of intended reciprocal communication by the wireless terminal. This may e.g. relate to an intended D2D communication with another device 20, including transmission and reception of data. The determination 420 of the spatial limitation may thus also take into consideration that radio transmission is expected also in the opposite direction.

In some embodiments, the spatial properties define a disallowed spatial range of transmission from the wireless terminal. This may involve a keep-out angle range, with respect to a certain position, and possibly also a power limit. Said certain position may be identified as the position of the terminal 10, or as a vector range with respect to a certain geographical position and direction from that position. Such spatial properties may be provided as spatial information 431 in the DL to the terminal 10, with or without any preceding resource request 410 from the terminal 10. In some embodiments, the transmission grant 430 is received from the base station transmission point 121, wherein the disallowed spatial range defines transmission towards said base station transmission point 121.

Embodiments providing a spatial limitation in the form of a keep-out angle range may involve the base station 120 providing a transmission grant 430 to the terminal 10 which identifies a right to transmit radio signals from the terminal 10, provided that no transmission is made in the keep-out angle range, i.e. a conditional transmission grant 430.

Examples of scenarios falling within the scope of different outlined embodiments will now be described. A terminal 10, or a user of the terminal 10, may be interested in radiating signals that are not a part of the conventional data transmission to/from the network 100, such as the base station 120. Examples include radar sweeps, side-communications with other terminals 20 or TRPs, or that a terminal 10 would function as a pico-cell for other terminals. In those cases, resources may have to be acquired for the transmissions.

In accordance with the various embodiments described above, various scenarios may entail the following:
1. The terminal 10 optionally signals its geographic position to the base station 120. In alternative embodiments, the network 100 may determine the position of the terminal 10.
2. The terminal 10 signals, to the base station 120, the direction of its intended transmission, possibly as directions relative to the direction toward the base station 120.
3. The terminal 10 optionally signals the intended or desired transmit power in said direction to the base station 120.
4. The terminal 10 may signal whether there will be transmission in the reciprocal direction, i.e., a received signal at the terminal 10 in said direction. This happens e.g. for the case of side-link where the terminal 10 is communicating with another terminal 20, but not in a case where a terminal 10 would function as a beacon for some other terminal 10s to listen to.
5. The terminal 10 may signal the network 100 to request to use said direction, and possibly power level:
   a) at will; or
   b) in a certain part of the time-frequency space.
6. The terminal 10 receives a transmission request response, such as a transmission grant, identifying the spatial limitation. This may be an ACK of the request, and/or may contain keep-out angles and associated power levels, or even include an order to follow a listen before talk (LBT) protocol.

A technical effect of the proposed solution, and as exemplified, is that if the terminal 10 intends to transmit in a direction other than towards the base station 120, such as e.g. perpendicular to the direction to the base station 120, and does not interfere with any other terminal 20 served by the base station 120, then there is improved spectrum usage since the operations of the terminal 10 would be transparent to the network.

Two use cases are outlined below with reference to the drawings of FIGS. 5 and 6.

Figure 5:
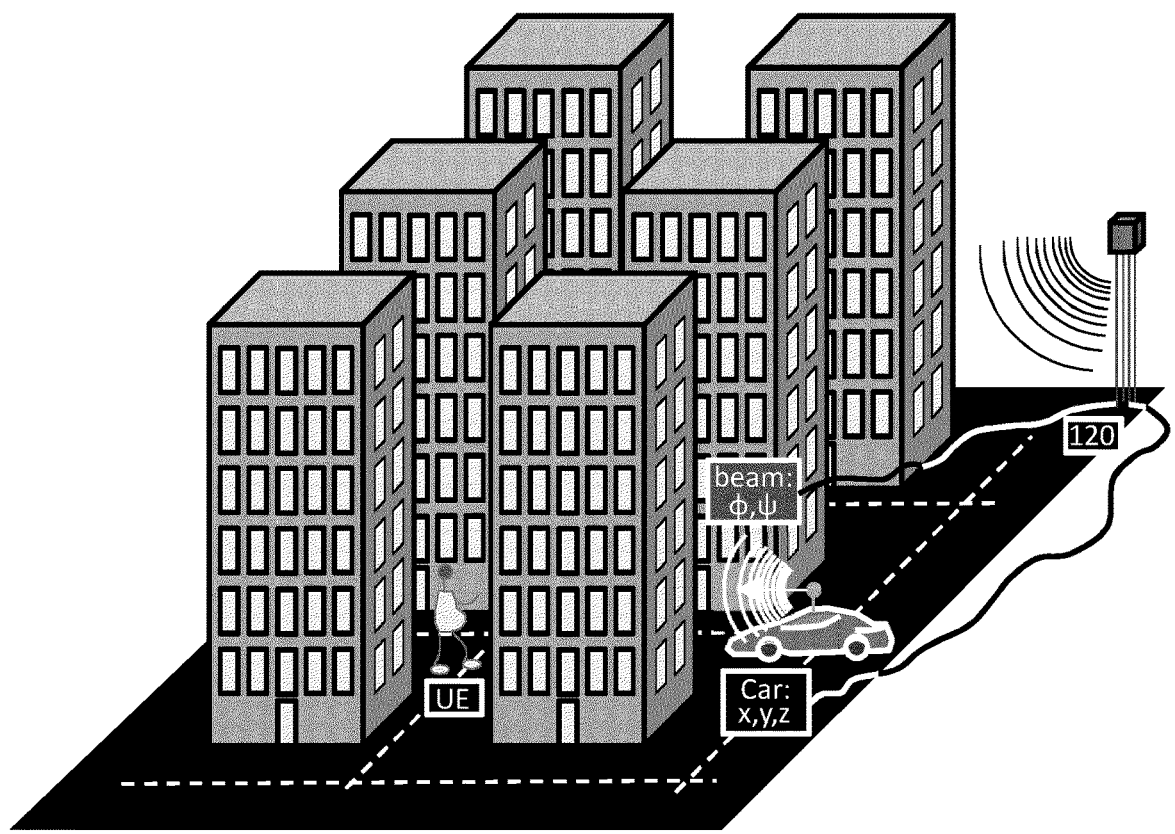
FIG. 5 schematically illustrates an embodiment of radio transmission controlled in accordance with an embodiment.

FIG. 5 shows an urban environment comprising a base station 120, such as a gNB. Moreover, two user devices are shown, one labeled UE and the other one labeled "Car". As illustrated, the UE has severe blockage to the base station 120, while the Car is in a LoS condition. However, the link between the car and the UE is of high quality, and they are therefore able to setup a side-link. The conventional side-link feature of NR consists of a request from the Car of resources in time and frequency. However, in accordance with the solutions proposed herein, a request is transmitted with identified spatial properties or information, identifying a spatial direction to the UE, for the purpose of releasing those time and frequency resources for other purposes. Conveniently, the base station may e.g. allocate the same resources for communication with another terminal. The Car signals, to the base station 120, its position (x, y, z), if not known or determined by the base station 120, as well as the intended spatial direction ($\phi$, $\psi$) of transmission towards the UE. The base station 120 confirms whether or not the car can transmit a signal along said direction.

It may be in fact be in the interest of the base station 120 that the Car establishes a link to the UE since this may be the only way for the base station 120 to reach the UE. In that case there may be need for a compensation scheme between the car and the base station 120. If the base station 120 is unaware of the UE, then it may be beneficial to establish a compensation scheme between the Car and the UE, such as an agreed discount or exchange or points or a virtual currency.

Figure 6:
FIG. 6 schematically illustrates another embodiment of radio transmission controlled in accordance with an embodiment.

FIG. 6 illustrates a system setup that optimizes coexistence between naval communications—for example civil or military communications at sea- and land-based cellular communications, sharing the same spectrum. The naval communication may not be interfered, so to make the land-based communication possible and optimize spectrum utilization, authorization is given to use radio spectrum in spatial directions not pointing towards a critical direction. In one embodiment, transmission in directions towards the sea are disallowed in the land-based cellular network 100, in areas close to the sea. In another embodiment, identification may be made of a ship 60 at sea, and specific directions towards the position of that ship are disallowed in the network 100. This is illustrated in the drawing of FIG. 6. In this exemplary scenario, the terminal D may be granted resources for transmitting to terminals B and C, and possibly to terminal A. Terminal C, on the other hand, may be disallowed to transmit to D and A, and possibly to B with a power limitation which represents a spatial limitation of distance.

Although the invention has been shown and described with respect to certain preferred examples, equivalents and modifications will occur to others skilled in the art upon the reading and understanding of the specification. The present invention includes all such equivalents and modifications and is limited only by the scope of the appended claims.

The invention claimed is:

1. A method for controlling radio transmission, carried out in a wireless terminal, comprising:
   obtaining, from a wireless network, a transmission grant which gives the wireless terminal permission to transmit a radio signal, wherein said transmission grant is indicative of a spatial limitation associated with the permission to transmit; and
   transmitting the radio signal in accordance with said spatial limitation,
      wherein said spatial limitation indicates a disallowed spatial range of transmission from the wireless terminal, the disallowed spatial range of transmission being towards a base station transmission point.

2. The method of claim 1, wherein obtaining the transmission grant includes receiving, from the wireless network, information indicative of radio resources to be used for the transmitting, wherein said radio signal is transmitted using the radio resources.

3. The method of claim 1, wherein the transmission grant is obtained responsive to the wireless terminal transmitting, to the wireless network, information defining spatial properties of an intended radio signal transmission from the wireless terminal.

4. The method of claim 1, comprising transmitting, to the wireless network, an indication of intended reciprocal communication by the wireless terminal.

5. The method of claim 1, wherein obtaining the transmission grant includes receiving, from the wireless network, spatial properties of said permission to transmit a radio signal.

6. The method of claim 3, wherein the spatial properties define a wireless terminal position.

7. The method of claim 3, wherein the spatial properties define a direction associated with intended transmission.

8. The method of claim 3, wherein the spatial properties define a transmission power limit.

9. A wireless terminal configured to communicate with a wireless network, comprising:
a radio transceiver; and
logic configured to control the radio transceiver to obtain a transmission grant from a wireless network, wherein said transmission grant is indicative of a spatial limitation associated with a permission to transmit a radio signal; and transmit the radio signal in accordance with said spatial limitation,
wherein said spatial limitation indicates a disallowed spatial range of transmission from the wireless terminal, the disallowed spatial range of transmission being towards a base station transmission point.

10. A method carried out in wireless network for configuring a wireless terminal for radio transmission, comprising:
transmitting, to the wireless terminal, a transmission grant, wherein said transmission grant is indicative of a spatial limitation associated with a permission for the wireless terminal to transmit a radio signal,
wherein said spatial limitation indicates a disallowed spatial range of transmission from the wireless terminal, the disallowed spatial range of transmission being towards a base station transmission point.

11. The method of claim 10, wherein transmitting the transmission grant includes transmitting radio resources for use by the wireless terminal under said spatial limitation.

12. The method of claim 10, comprising receiving, from the wireless terminal, information defining spatial properties of an intended radio signal transmission from the wireless terminal, wherein the transmission grant defines the spatial limitation based on said intended spatial information.

13. The method of claim 12, comprising receiving, from the wireless terminal, an indication of intended reciprocal communication by the wireless terminal.

14. The method of claim 10, wherein the transmission grant includes spatial properties of said permission to transmit a radio signal.

15. The method of claim 10, wherein the spatial properties define a wireless terminal position.

16. The method of claim 10, wherein the spatial properties define a direction associated with intended transmission.

17. The method of claim 10, wherein the spatial properties define a transmission power limit.

* * * * *